3,042,718
UREA COMPOSITIONS
Peter Evans and Dennis Godfrey Brooke, both of Norton-on-Tees, England, assignors to Imperial Chemical Industries Limited, London, England, a corporation of Great Britain
No Drawing. Filed Dec. 9, 1959, Ser. No. 858,320
Claims priority, application Great Britain Dec. 17, 1958
3 Claims. (Cl. 260—555)

This invention relates to compositions of urea in particulate form.

Particulate urea, that is to say urea in either crystalline, granular or pelleted form, and compositions in any of these forms which contain urea, have, in general, the disadvantages that they do not flow or run freely except when thoroughly dry and even when thoroughly dry they quickly lose their free-flowing properties and tend to cake in storage.

Free-flowing properties are important in urea and in compositions containing it which are to be mixed with other materials, or are to be conveyed, transported or otherwise handled and is also of importance when the urea or compositions containing it are to be used as fertilizers, since satisfactory distribution on the land depends on such free-flowing properties.

According to the present invention there is provided a process for the preparation of particulate urea having improved free-flowing properties and improved resistance to caking which comprises providing for the presence in the particulate urea of a minor quantity by weight of a substituted urea of the general formula

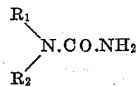

in which $R_1$ is a monovalent organic group and $R_2$ is a member of the class comprising hydrogen and monovalent organic groups.

Suitable groups for $R_1$ and $R_2$ include carbocyclic groups such as for example cyclohexyl, phenyl, tolyl, xylyl, n-butyl phenyl, n-dodecyl phenyl, alkoxy phenyl, amino and N-substituted amino phenyl, carboxy phenyl, halogenophenyl, nitro phenyl, nitro tolyl, phenyl-phenyl, anthraquinonyl and hydroxynaphthyl groups, heterocyclic groups such as pyridyl and methypyridyl groups and aliphatic groups such as butyl, nonyl, tetradecyl, hexadecyl and octadecyl groups.

While $R_2$ may be a group similar to $R_1$ it may be different and is preferably hydrogen.

The presence of the desired substituted urea in the particulate urea may be provided by introducing into the particulate urea at an appropriate stage in its preparation and under appropriate conditions, for example at a temperature in the range of 20° C. to 110° C. and preferably at a temperature between 55° C. and 95° C., a compound, for example the amino compound corresponding to the desired substituted urea, which will react with the particulate urea to produce the desired substituted urea.

The substituted urea may however be added as such to the particulate urea at an appropriate stage in its preparation.

When it is desired to produce, in the particulate urea, a desired substituted urea by introducing into the particulate urea the corresponding carbocyclic amino compound, it is preferable, for example in the case of a substituted aniline, for the substituent to be predominantly ortho-para directing group and to be in the para-position to the amino group.

The quantity of substituted urea to be provided in the particulate urea will depend on various factors, for example whether it is produced in situ or is introduced as such but in general it has bene found that a quantity in the range of 0.0001% to 0.5% by weight of the urea is sufficient for good results. With crystalline urea the preferred quantity is in the range of 0.001% to 0.1% by weight.

The substituted urea, or the compound for producing it in situ, may be introduced for example into crystalline urea during a usual drying stage in a process for preparing the crystalline urea from a melt or concentrated solution.

When crystalline urea is obtained in a continuous manner by evaporating and drying in a paddle drier a melt produced by synthesis from ammonia and carbon dioxide it has been found convenient to introduce the substituted urea, or the compound for producing it in situ, into the crystalline urea in the paddle drier during the later stages of the drying operation while the crystalline urea is still hot.

The substituted urea, or the compound for producing it in situ, may however be introduced into crystalline urea after a usual drying stage and preferably while the crystalline urea is still hot, for example at a temperature in the range of 55° C. to 95° C.

For improving the free-flowing properties and resistance to caking of particulate urea in granular form, the substituted urea or the compound for producing it in situ, may be introduced into the particulate urea at any stage of a granulation process, that is before, during, or after a granulation stage, or during or after a subsequent drying stage while the then granular urea is still hot, for example at a temperature in the range of 55° C. to 95° C.

The process of the present invention may be applied in two ways to the prepartion of pelleted urea having improved free-flowing properties and improved resistance to caking. It is to be understood that by the expression "pelleted urea" is meant particulate urea in the form of small pieces, for example short cylindrical pieces, which are made from substantially crystalline urea by such methods as extruding through or compressing in suitable dies.

The presence of the substituted urea according to the present invention may be provided for in pelleted urea by introducing it, or the compound to produce it in situ, into the crystalline urea before pelleting or it may be added to the finished pellets preferably while hot, for example at a temperature in the range of 55° C. to 95° C. Both procedures give satisfactory results.

It will be understood that it is desirable for the substituted urea, or the compound for producing it in situ, to be distributed as uniformly as possible throughout the particulate urea. This may be satisfactorily achieved by introducing the substituted urea, or the compound for producing it in situ into the particulate urea by spraying as a solution or suspension while the particulate urea is being agitated in suitable apparatus.

When the substituted urea, or the compound for producing it in situ, is a solid it is preferred to apply it in finely divided form to the particulate urea while the latter is being agitated in suitable apparatus, for example in a paddle mixer or drier or by tumbling in a rotating drum.

The following tables show results obtained from laboratory tests in which the presentce of a substituted urea was provided in crystalline urea in the manner and quantity as stated at the head of each table.

In the tables the second columns show the "caking index" of a sample of crystalline urea as received from a synthesis plant and the third columns show the "caking index" of a sample from the same batch to which the compound mentioned in the first columns was added. The corresponding samples were stored in glass bottles for the same period of time and the "caking index" was determined thereafter on the basis of the number of blows of substantially equal magnitude that it was necessary to impart to each glass bottle, after being inverted, to disintegrate the mass of crystalline urea therein, to a substantially free-flowing condition.

It is to be noted that the variation in the figures given in the second columns of the tables is due to the actual physical condition of the particular batch of crystalline urea as received from the synthesis plant.

TABLE 1

[The compound in the first column was used in quantity of 0.01% by weight of the urea and was distributed throughout the urea by shaking or tumbling at the temperature shown in the fourth column]

| | | | |
|---|---|---|---|
| p-Toluidine | 12 | 1 | 65° C. |
| Do | 13 | 1 | 65° C. |
| Do | 7 | 1 | 65° C. |
| Do | 13 | 1 | Room temperature. |
| Do | 8 | 0 | 70° C. |
| p-Anisidine | 12 | 1 | 70° C. |
| p-Phenetidine | 16 | 1 | 70° C. |
| As-dimethyl-p-phenylenediamine | 16 | 0 | 70° C. |
| As-diethyl-p-phenylenediamine | 16 | 1 | 70° C. |
| 2:4-Xylidine | 5 | 0-1 | 70° C. |
| p-Aminodiphenyl | 16 | 2 | 70° C. |

TABLE 2

[The compound in the first column was used in quantity of 0.1% by weight of the urea and was introduced into the urea while the latter was agitated in a steam-jacketed paddle mixer during a period of 15 minutes]

| | | |
|---|---|---|
| p-Toluidine | 27 | 0 |
| Do | 7 | 0 |
| Sulphanilic acid | 27 | 13 |
| Do | 7 | 2 |
| p-Nitroaniline | 27 | 12 |
| Do | 7 | 2 |
| p-Bromoaniline | 27 | 1 |
| Do | 7 | 1 |
| Aniline | 12 | 1 |
| o-Toluidine | 12 | 0-1 |
| p-Phenylenediamine | 12 | 0-1 |
| 2-Amino-4-nitrotoluene | 12 | 2 |
| p-Aminodiphenylamine | 7 | 2 |
| 4-Aminophthalic acid | 12 | 1 |
| Benzidine | 7 | 1 |
| Tolylene 2:4-diamine | 7 | 1 |
| Diphenylamine | 12 | 6 |
| Phenacetine | 7 | 4 |
| Phenylhydrazine | 7 | 1 |
| 1-Aminoanthraquinone | 7 | 4 |

TABLE 3

[The compound in the first column was used in quantity of 0.05% by weight of the urea and was distributed throughout the urea by tumbling for a period of 15 minutes at room temperature]

| | | |
|---|---|---|
| 4-Nitrophenylurea | 6 | 2 |
| 4-Carboxyphenylurea | 4 | 1 |
| 2:4-Dimethylphenylurea | 8 | 3 |
| 4-Phenylphenylurea | 6 | 2 |

TABLE 4

[The compound in the first column was used in quantity of 0.1% by weight of the urea and was distributed throughout the urea by tumbling for a period of 15 minutes at room temperature]

| | | |
|---|---|---|
| Mono-p-1-tolyurea (4-Methylphenylurea) | 39 | 1 |
| Do | 8 | 1 |
| Mono-o-1-tolyurea | 39 | 4 |
| Phenylurea | 39 | 4 |
| 4-Dimethylaminophenylurea | 39 | 0 |
| 4-Methoxyphenylurea | 39 | 1 |
| Cyclohexylurea | 8 | 1 |
| 4-n-Butylphenylurea | 10 | 7 |
| 4-n-Dodecylphenylurea | 10 | 5 |
| Gamma-Pyridineurea | 8 | 1 |
| 5-Methylpyridine-2-urea | 8 | 2 |
| Anthraquinone-1-urea | 4 | 0 |
| 2-Naphthol-3-urea | 5 | 1 |
| 2-Methyl-5-nitrophenylurea | 4 | 1 |
| 4-4-Ethoxyphenylurea | 4 | 0 |
| 4-Chlorophenylurea | 14 | 1 |
| 4-Iodophenylurea | 29 | 1 |
| 4-Aminophenylurea | 29 | 2 |
| 4-Acetylaminophenylurea | 29 | 2 |
| As-Dinonylurea | 15 | 4 |
| As-Dicyclohexylurea | 15 | 5 |
| As-Diphenylurea | 15 | 6 |
| As-Dibutylurea | 10 | 3 |
| Octadecylurea | 12 | 0-1 |
| Hexadecylurea | 12 | 0-1 |
| Tetradecylurea | 12 | 1 |

The process of the present invention is further illustrated in the following examples.

*Example 1*

Into crystalline urea at a temperature of about 75° C. being continuously obtained by evaporating and drying in a paddle drier a melt produced by synthesis from ammonia and carbon dioxide there was introduced near the outlet to the drier para-toluidine in finely divided form and at a rate to provide 0.01% by weight of the urea. The product was filled into 1 cwt. bags and stacked 20 bags high. It was found, after three months storage, that the crystalline urea, even in the undermost bags, was free-flowing and devoid of any tendency to cake.

*Example 2*

Into crystalline urea at a temperature of 70° C. while being tumbled in a rotating drum there was introduced 0.01% by weight of asymmetric dimethyl-p-phenylenediamine in finely divided form and the tumbling continued until the finely divided amino compound was substantially uniformly distributed throughout the mass. The product was filled into bags and stacked 20 bags high. After several months storage it was found that the crystalline urea even in the undermost bags was free-flowing and devoid of any tendency to cake.

*Example 3*

Pellets of urea, produced by extruding through cylindrical dies, were tumbled in a rotating drum at 70° C. while finely divided asymmetric dimethyl-p-phenylenediamine was introduced in an amount of 0.01% by weight of the pellets. The product was filled into bags and stored as described in the previous examples. After three months storage it was found that the pellets even in the undermost bags were substantially free-flowing.

*Example 4*

Pellets of urea were produced by extruding crystalline urea which had been prepared substantially as described in Example 1 except that the quantity of p-toluidine was 0.1% by weight of the urea. The pellets were bagged and stored as described in the previous examples. After three months storage the pellets even in the undermost bags were still substantially free-flowing.

We claim:
1. Urea having improved free flowing properties and improved resistance to caking which consists essentially of particulate urea and from 0.0001% to 0.5% by weight of a substituted urea of the formula

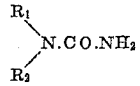

in which $R_1$ is a radical selected from the group consisting of cyclohexyl, phenyl, tolyl, xylyl, n-butyl phenyl, n-dodecyl phenyl, alkoxy phenyl, amino phenyl, carboxy phenyl, halogenophenyl, nitro phenyl, nitro tolyl, phenylphenyl, anthraquinonyl, hydroxynaphthyl, pyridyl, methypyridyl, butyl, nonyl, tetradecyl, hexadecyl and octadecyl, and $R_2$ is a radical selected from the group consisting of hydrogen, cyclohexyl, phenyl, tolyl, xylyl, n-butyl phenyl, n-dodecyl phenyl, alkoxy phenyl, amino phenyl, carboxy phenyl, halogenophenyl, nitro phenyl, nitro tolyl, phenylphenyl, anthraquinonyl, hydroxynaphthyl, pyridyl, methypyridyl, butyl, nonyl, tetradecyl, hexadecyl and octadecyl.

2. Particulate urea as claimed in claim 1 wherein $R_1$ is a tolyl group and $R_2$ is hydrogen.

3. Particulate urea as claimed in claim 1 wherein $R_1$ is an amino phenyl group and $R_2$ is hydrogen.

(References on following page)

References Cited in the file of this patent

UNITED STATES PATENTS

| | | |
|---|---|---|
| 2,386,937 | De Groote et al. | Oct. 16, 1945 |
| 2,436,771 | Hood | Feb. 24, 1948 |
| 2,569,984 | Fetterly | Oct. 2, 1951 |
| 2,712,557 | Michelitsch et al. | July 5, 1955 |
| 2,768,971 | Jones | Oct. 30, 1956 |
| 2,826,612 | Over et al. | Mar. 11, 1958 |

FOREIGN PATENTS

| | | |
|---|---|---|
| 771,420 | Great Britain | Apr. 3, 1957 |
| 266,378 | Great Britain | Jan. 26, 1928 |

OTHER REFERENCES

Rodd: Chemistry of Carbon Compounds, vol. IB, (1952), page 911.